United States Patent [19]

Boeke

[11] 4,181,951
[45] Jan. 1, 1980

[54] IN-LINE PH AND PION CONTROLLER

[76] Inventor: Jan Boeke, P.O. Box 2327, Chapel Hill, N.C. 27514

[21] Appl. No.: 900,908

[22] Filed: Apr. 28, 1978

[51] Int. Cl.² .......................... G06F 15/46; C02C 5/12
[52] U.S. Cl. .................................... 364/499; 204/149; 364/502
[58] Field of Search ............... 364/496, 497, 499, 500, 364/502; 204/130, 149; 324/30 R

[56] References Cited

U.S. PATENT DOCUMENTS

| | | | |
|---|---|---|---|
| 3,664,951 | 5/1972 | Armstrong | 204/149 X |
| 3,718,556 | 2/1973 | Rohrback | 204/149 |

*Primary Examiner*—Jerry Smith
*Attorney, Agent, or Firm*—Connolly and Hutz

[57] ABSTRACT

The location of a number larger than two of pH or pIon sensors for ionic composition control are distributed over the cross-sectional area of the process line. Each individual sensor signal is digitized and converted to its antilogarithm and these antilogarithms are averaged to a control signal in the form of a binary word, for a binary reagent dispensing system. Reagent from this system is transported by a carrier liquid and dispensed from orifices distributed over the cross-section of the process line, downstream of the sensors. Upstream of the sensors, a backmixing passive mixer homogenizes the process stream; downstream of the reagent orifices a nonbackmixing passive mixer homogenizes process liquid plus reagent. This control section of the process line may be followed by a second, identical section dispensing diluted reagent, while its averaged control signal may also be fed back to the data processor processing the control signal of the first section, in order to optimize first section dispenser control. The data processors also multiply the composition signal with process stream flow rate as measured by a flowmeter, and shut off the system if flow rate drops below a minimum.

A final section containing only distributed sensors followed by a backmixing static mixer for final homogenization may replace or follow the second control section; its averaged signal is used for the feedback optimization of the control by the preceding section, and for final monitoring of the adjusted process.

20 Claims, 1 Drawing Figure

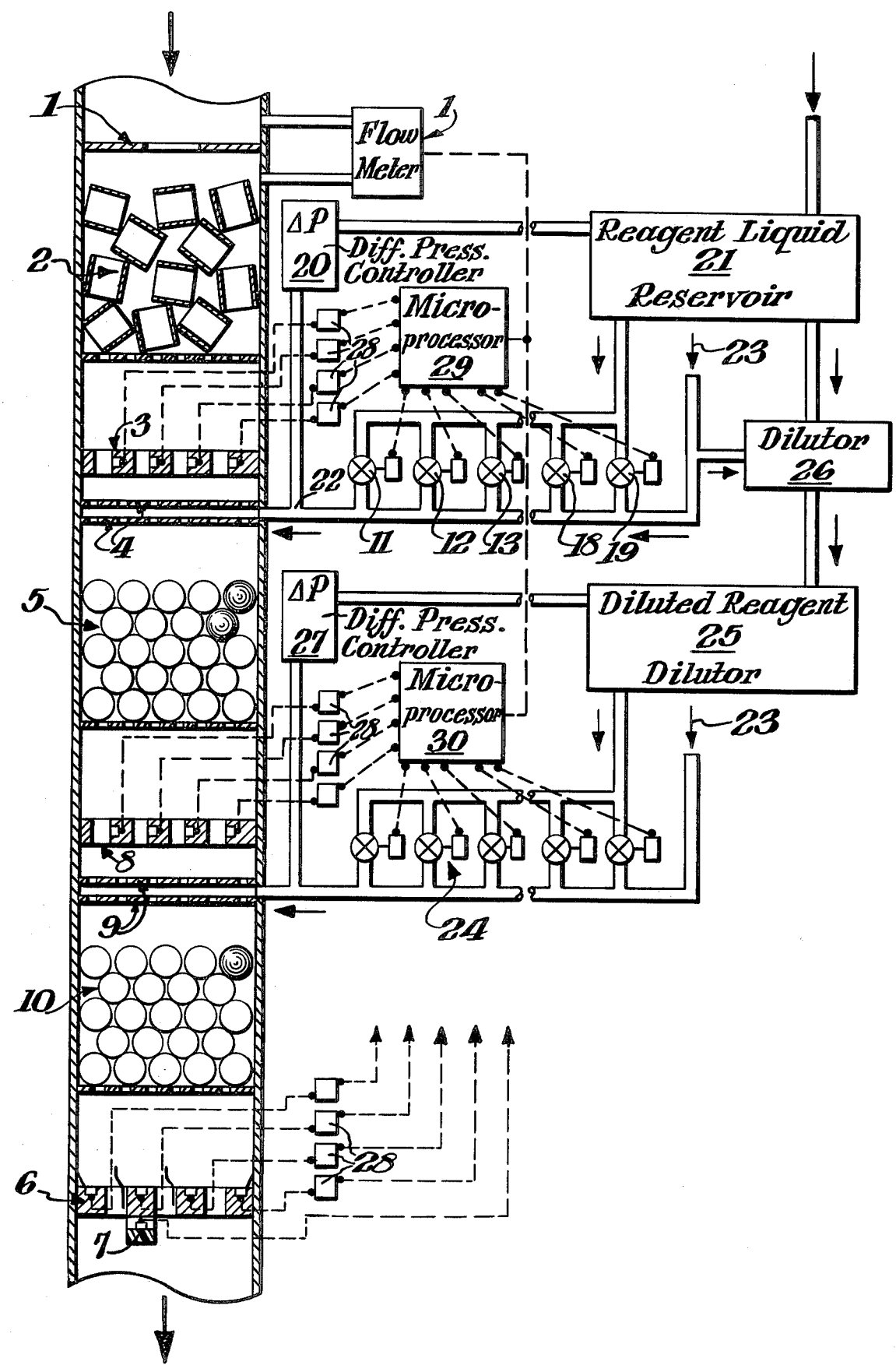

# IN-LINE PH AND PION CONTROLLER

CROSS REFERENCE TO RELATED APPLICATIONS

None.

BACKGROUND OF THE INVENTION

Present-day technology for the adjustment of pH or pIon in process- or waste-streams discourages in-line control; "A well-stirred tank which is easily controlled will always give more satisfactory results than a plug-flow process fitted with a complex system of instruments", F. G. Shinskey in: "pH and pIon Control In Process And Waste Streams"; Wiley-Interscience, 1973; p. 242.

However, tanks are more expensive than (plugflow) pipeline, and turbine mixers not only more expensive but also more vulnerable than passive mixers. The present invention intends to reduce the "complex system of instruments" to a compact, effective system giving accurate pH or pIon control in the process line with its inherent plug flow, at least as satisfactory as previously possible with mixing tanks and active mixers.

SUMMARY

Reactions which are amenable to pH or pIon control by sensor electrodes are necessarily reactions between ions, which are intrinsically fast and may be consummated while the reacting liquid is flowing only a short distance through a pipeline, provided the distances the ions have to travel by diffusion are small due to appropriate provisions. Although these basic facts are well known to today's chemical engineers, these engineers assume that the mass transfer operations necessary for accurate completion of such reactions using today's equipment, are cumbersome to the degree that it is preferable to perform the reactions in plenty of time in separate reaction tanks, in a (semi-)batchwise operation, rather than to initiate and control them in the line carrying the liquid to be processed.

The present invention consists of a number of steps, some of which are novel and separately applicable in other situations, which speed up the necessary mass transfer operations to the degree, required for successful total control of the reaction directly performed in the process line itself. This line may be a pipe, or a ditch as is common in wastewater processing.

These steps may be summarized as follows:

1. The process stream is mixed before and after reagent addition, by the use of passive mixers;

2. To catch possible deficiencies in mixing, a number of pH- or pIon-sensitive sensors are distributed on a supporting grid over the cross-section of the process line, rather than the single, or at best double, sensor installations used today. Using multiple sensors fully submerged and under overpressure is now possible by the use of novel solid-state sensors as described in my U.S. Pat. No. 4,133,732, issued Jan. 9, 1979.

3. The electrical analog signal put out by each of these sensors is individually processed electronically by modern means to digital antilogarithms of the original signal; then averaged and further electronically processed to a binary number or "command word" which controls the operation of special control valves. This very fast electronic processing allows introducing factors related to the flow rate of the process stream as derived from a flow meter, and to the buffer capacity of the process liquid. Averaging of raw electrode signals, as may be done today, introduces errors which are circumvented by individual antilogging before averaging. This is of special importance in the control-technically difficult case of neutralizing unbuffered liquids.

4. As a composite control valve, the novel arrangement of a number of solenoid on-off valves in parallel, is introduced. Each valve is restricted in its flow-through by an orifice. By grading the effective area of these orifices in the binary power series 1, 2, 4, 8, etc., every more significant digit or bit of the binary command word now energizes the operation of its own on-off valve with a doubled flow-through capacity, whereby a digit 1 may mean open, and a digit 0 means closed. In this way, with a limited number of valves, a very wide range of reagent flow can now be controlled very fast, very reproducibly and more economical than possible with today's control valves. A differential pressure controller keeps the differential pressure of reagent liquid across the valves constant, regardless of reagent demand, and regardless of process line pressure at the point of injection.

5. To again speed up reagent delivery and to insure effective distribution of reagent across the entire process line cross-section regardless of the amount of reagent dispensed, a stream of neutral carrier liquid, or bypassed process liquid fed by a pump, is used to entrain the output of the reagent control valves and to force this mixture through a multitude of orifices distributed over the cross-section of the process line. This approach has the advantage that powdered solid reagent, dispensed in a similar binary mode and then suspended in the carrier liquid, may be used instead of liquid reagent.

6. Sensors, reagent orifices and passive mixer make up a control section in the process line. Two or more of these control sections, preferably utilizing stepwise diluted reagent, more diluted in successive sections, may be cascaded for finer control. Hereby the output of the downstream sensors (eventually as a final grid of sensors only, following the last control section), antilogged, digitized and averaged as described above, is not only used for control of its own section, but also for a feedback-correction of the reagent-command of the previous, more upstream, section in order to establish correction for buffer capacity of the process liquid.

7. In the case of pH-control of a process liquid which may be too acid as well as too alkaline at different moments, reagent dispensing systems in first and/or later sections may be doubled to provide for addition of either the alkaline or acid reagent as called for by the sensors. The electronic data processor should prevent oscillating alternation of these reagent systems to preclude waste of reagents.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

The single FIGURE indicates schematically in elevation the arrangement of two control sections, preceded by a flowmeter and a static backmixer, and followed by a final sensor section, which constitutes one embodiment of this invention.

DESCRIPTION OF THE PREFERRED EMBODIMENT

In FIG. 1, an orifice flowmeter is designated by 1. However, any accurate flowmeter with electrical signal output may be used. In case the process line is an open ditch, a metering flume will be more appropriate. 2 designates a static mixer of the backmixing type, symbolized by a bed of "Raschig Rings". These rings are sections of thin-walled tubing, about as high as they are wide. Such a bed not only repeatedly splits and joins separate stream threads of the process liquid, but within the cavities of the rings some process liquid is retained and released at a slower rate than the average process flow rate, producing the effect of backmixing. The end result is that a step-change of composition in the process stream is stretched into a ramp-change of composition, radially homogeneous from pipe-wall to pipeline center, rather than with a parabolic front as in plug flow.

A grid across the process line carrying a number of composition sensors, is designated by 3. These sensors have to operate reliably under total immersion under some ambient overpressure. "Button Electrodes" of the type described in U.S. Pat. No. 4,133,732, issued Jan. 9, 1979 by the same inventor, embedded with some polymer in a rigid supporting grid, and preferably accompanied by an impedance transforming integrated circuit operating individually for each individual electrode, would be able to satisfactorily perform the demanding service required. The sensors should be positioned such that shear flow across their sensitive faceplate maximizes fast response.

The grid supporting the sensors may be followed by or be made part of, the distribution system which dispenses reagent evenly over the cross-section of the process stream, as shown by 4. It is advantageous to create local turbulence in the process liquid at the dispensing orifices in order to speed up the adjustment reaction between reagent and process liquid. Further mixing is enhanced by the non-backmixing static mixer 5. Such a static mixer is symbolized by a bed of spheres which split up and recombine the process stream without retention or backmixing, hence without introduction of deadtime between the reagent dispenser and the next grid of sensors. Various types of effective non-backmixing static mixers are commercially available.

The static mixer 5 should be followed by the final sensor assembly 6 unless the control section is duplicated as discussed below. The sensors in grid 6 may be positioned as shown in grid 3, or in any different way which enhances shear flow of process liquid across their sensitive faceplates, as is shown in 6 by the use of flow deflectors. The final sensor-supporting grid also carries a reference electrode 7, again preferably of the type described in U.S. Pat. No. 4,133,732, issued Jan. 9, 1979, consisting of an electrode embedded in gelled endpoint-composition process liquid. By locating this reference electrode at the end of the composition-adjustment sections, there is minimum possibility of contamination of the reference gel in the long run. This reference electrode designates the base potential from which the signal potential of each of the many sensor electrodes is measured.

Between mixer 5 and sensor grid 6, another reagent dispensing section containing elements 8, 9, and 10 which are identical to respectively elements 3, 4 and 5 may be inserted to fine-tune process liquid composition adjustment. A third and fourth section dispensing a different type of reagent may be added also. This total assembly of control sections, final grid and end mixers, including another backmixing static mixer similar to 2, to follow final sensor grid 6 for even better mixing of the adjusted process stream if desired, forms the mechanical part of the controller located in the process line.

The electrical composition-related signals put out by the sensors are processed electronically in a way to be discussed further down, to one signal going to the reagent dispensing control valves 11, 12, 13, . . . 18, 19. This command signal is digital, and has the form of a binary number or "word". Such a number consists of the digits 1 and 0, wherein a 1 causes the solenoid of a specific on-off solenoid valve to be energized and the valve opened. The appearance of a 0 for that particular valve, de-energizes the solenoid and causes the valve to close. By installing as many valves as digits in the control command word, every digit in the word may command its own valve. If now the valves are placed parallel to each other between a reagent reservoir under constant overpressure and the process line, and if each adjacent valve counting from the valve controlled by the least significant bit, is provided with an orifice which allows twice as much reagent to flow through as its smaller neighbor, every more significant bit in the control word commands a reagent flow twice as large as the flow commanded by its adjacent less significant bit. The total flow of the control valve assembly now becomes directly related to the total numerical value of the control command word. For example: a word of 10 binary digits or bits commands a total flow of from 0 to 1024 arbitrary units of flow although the diameters of the orifices in the 10 control valves only in crease from 1 to 32 arbitrary length units. The subdivision in 10, or any other desired number of valves makes possible a very fast and very reproducible reagent flow control responding to commands for minute increases or decreases as fast as for large changes.

Differential pressure controller 20 causes a constant pressure differential in the reagent liquid from reservoir 21 across the control valves to process line pressure at 22, e.g. by pressurizing the reagent reservoir with air. A flow of carrier liquid 23 ensures rapid transportation of even small amounts of reagent to the dispensing orifices in the process line at 4. This carrier liquid may be water or process liquid from the process stream, moved by a separate pump.

The drawing shows addition of controlled amount of liquid reagent. In a similar way slurry or powdered solid reagents can be added to the carrier liquid by feeders with sequentially doubling capacities, controlled by a binary control word. If two cascaded control sections are used, as shown in FIG. 1, the second, downstream, section may be fed from a similar control valve assembly 24, which now advantageously dispenses diluted reagent 25 from dilutor 26 in order to make possible a wider range of controlled reagent addition to the process stream. Again, the reservoir of diluted reagent should be pressurized to a constant pressure differential over control valves 24, by differential pressure controller 27, just as was done with the previous control section. However, if the previous section dispensed solid reagent, suspended or dissolved in carrier liquid, the second control section may advantageously narrow the final control range of the adjusted process liquid composition by using liquid reagent. Or the second, or any identical additional, control section may control the addition of a different reagent to correct a different deficiency in the process liquid, as e.g. acidic versus alkaline reagent in correcting the pH of the process stream which may be above as well as (at some other time) below the desired pH. The electrical signal derived from the sensors in that section will decide whether the section's reagent addition will be activated, or whether the pH calls for addition of different reagent from another section. In this case, it is of particular advantage that the system of on-off control valves can shut off tight; something which should not be counted on with present-day control valves. Since leakage means extra chemicals to be neutralized, it represents waste.

In order to accomplish the desired control valve operation, the electrical signal of the sensor electrodes has to be processed. This means that the high electrode impedance has to be lowered by an impedance transformer; the electrical analog signal between sensor and reference digitized; and the antilogarithm of this digital signal computed (or first antilogged and then digitized) by an integrated circuit 28. This has to be done for each individual sensor separately, and only then should the processed electrode signals be averaged, since only in this way a truly arithmetic average of composition signals can be obtained.

Sensor electrodes by their nature have an output which is the logarithm of actual ionic concentration in the liquid to be measured. Should different electrode outputs, representing locally different ionic concentrations, be averaged directly by connecting in parallel, an average of the logarithms of ionic concentration differences would be obtained which mathematically may be called a geometric average. However, the actual difference in ion concentrations should be averaged by algebraic addition of these concentrations (and then division by the number of sensors), an operation of which the logarithm cannot be taken. Hence not geometrical, but arithmetical averaging is required. This refinement becomes meaningful if unbuffered process liquids have to be neutralized. Small local differences in ionic (hydrogen ion-) concentration turn into large differences in logarithms of these concentrations as shown by large differences in sensor potential. The geometric average of these large potential differences would deviate quite markedly from the small differences in antilogarithm of these potentials, or small differences in actual ion concentration which should be averaged arithmetically. To derive most benefit from this correction, the sensors should be positioned in such a way over the cross-section of the process line, that each represents a stream of process liquid of about equal volume.

The averaged digital antilog output of the sensors lends itself directly to substraction of the number of ion equivalents of reagent introduced into the process stream to produce the desired endpoint concentration; this output can also be multiplied by a variable factor, like process flow rate from flowmeter 1 or buffer capacity of the process liquid, computed from the downstream sensor response to a certain addition of reagent. All these computational manipulations of the averaged sensor signal, and its process into a valve command word of the proper format, may be done inexpensively by microprocessor 29 for the first, and 30, for the second control section in the drawing. Modern electronic technology may allow combination of all operations done by separately presented circuit units 28, 29 and 30, in one VLSI (very large scale integrated circuit). This electronic processing is done momentary; in combination with the fast acting control valves, an inexpensive and sophisticated control action can be effected sufficiently fast to produce locally, on-line, the same satisfactory control as is obtained today with voluminous mixing tanks and active mixers, in batchwise control.

What is claimed is:

1. A method of controlling ionic characteristics in a flow line having a stream flowing therein comprising the steps of distributing a pattern of ionic sensors over the cross-sectional area of the flow line to generate individual sensor signals in response to the ionic characteristics detected by each of the sensors, converting each of the signals to its antilogarithms, averaging all the antilogarithms, converting the average antilogarithm to a binary control word, providing reagent orifices downstream of the sensors in a pattern distributed across the cross section of the flow stream, controlling the release of the reagent to the orifices from individual reagent dispensers in accordance with the binary control word, and mixing the flow stream downstream of the reagent orifices to homogenize it.

2. A method as set forth in claim 1, wherein the step of mixing flow stream is performed upstream of the sensors in a backmixing passive manner.

3. A method as set forth in claim 2, wherein the step of mixing the flow stream downstream of the reagent orifices is performed in a static manner.

4. A method as set forth in claim 1, wherein the recited set of steps are followed by a second set of steps substantially identical to the recited set to cascade the control function.

5. A method as set forth in claim 4, wherein the signals derived from the second set of sensors are fed back into the first set to optimize the control.

6. A method as set forth in claim 4, wherein a final set of distributed sensors are disposed in the flow stream after the second set of sensors and reagent orifices and the signal from the final set of sensors is used to correct the signals from upstream sensors to finely adjust the control word to the ionic characteristics of the flow stream.

7. A method as set forth in claim 1, wherein liquid derived from the flow stream is utilized to carry the output of the reagent dispensers to the reagent orifices.

8. A method as set forth in claim 1, wherein a multitude of parallel arranged reagent dispensers are individually operated either full on or full off to effect definable reagent addition.

9. A method as set forth in claim 1, wherein the reagent dispensers have capacities and are operated to dispense multiples of each other to facilitate addition of predetermined amounts of reagents to the flow stream.

10. An apparatus for controlling the ionic characteristics of a stream of liquid flowing in a line comprising an array of ionic sensors distributed across the cross section of the line, each of the sensors being connected to an individual antilogging means, the antilogging means being connected to a digitizing means, the array of digitizing means being connected to an averaging means, the averaging means being connected to a binary signal generating means for providing a binary control word, a system for dispensing reagent distributed over the cross section of the flow stream downstream of the sensors, an array of reagent dispensers connected to the reagent orifices system, control means connecting each of the dispensers to the binary control word generating means for controlling the release of reagent from each of the dispensers in accordance with the ionic characteristics detected by the sensors, and mixing means in the line downstream of the reagent orifices to homogenize the flow stream.

11. An apparatus as set forth in claim 10, wherein a flowmeter directs a signal commensurate to the flow stream to the binary signal generating means to correlate the binary control word to variations in the flow-rate of the flow stream.

12. An apparatus as set forth in claim 10, wherein a mixer is provided in a flow stream upstream of the sensors.

13. An apparatus as set forth in claim 12, wherein a mixer is provided in the flow stream downstream of the reagent orifices.

14. An apparatus as set forth in claim 13, wherein the mixer upstream of the sensors is a back mixing passive mixer and the mixer downstream of the reagent orifices is a non-back-mixing passive mixer.

15. An apparatus as set forth in claim 10, wherein the dispensers have fully on or fully off characteristics.

16. An apparatus as set forth in claim 15, wherein the dispensers have capacities which are multiples of each other to facilitate the control function.

17. An apparatus as set forth in claim 16, wherein the capacities of the reagent dispensers are graded in a binary power series.

18. An apparatus as set forth in claim 10, wherein the apparatus is repeated in sequence in the line to facilitate the control.

19. An apparatus as set forth in claim 10, wherein the apparatus is followed downstream by a secondary array of ionic sensors distributed across the crossection of the line, each of the secondary array of sensors being connected to a secondary individual antilogging means, each of the secondary individual antilogging means being connected to a secondary digitizing means, each of the secondary digitizing means being connected to a secondary averaging means, and the secondary averaging means being connected to the binary signal generating means of an upstream array to adjust the resulting binary control word to the ionic characteristics of the flow stream.

20. An apparatus as set forth in claim 10, wherein the reagent orifices are distributed in a pattern which corresponds to that of the sensors in the flow stream.

* * * * *